Patented Feb. 26, 1929.

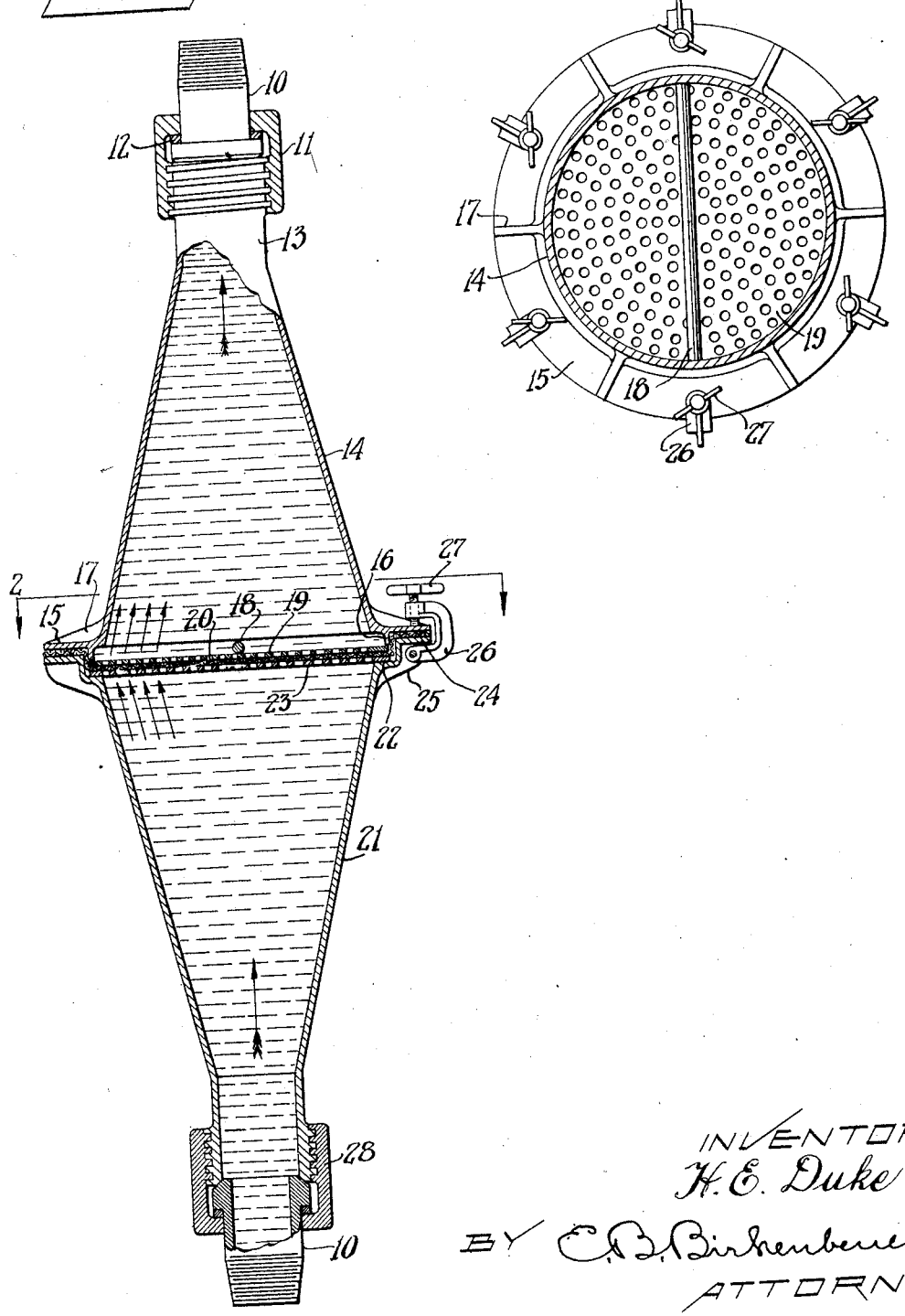

1,703,440

UNITED STATES PATENT OFFICE.

HARVEY E. DUKE, OF PORTLAND, OREGON.

MILK STRAINER.

Application filed July 25, 1927. Serial No. 208,184.

This invention relates generally to the dairyman's art, and especially to a type of milk strainer adapted to be inserted in pipe lines through which milk passes.

The first object of this invention is to provide an exceedingly simple and efficient form of strainer which can be inserted into a milk pipe line through which milk is passing either by gravity or by a pumping action.

The second object is to provide a strainer which will efficiently and quickly remove all foreign substances from the milk without any additional labor on the part of the operator and at a very small expense when compared with the larger present day straining apparatus.

The third object is to so construct the device that it can be easily assembled or taken apart for cleansing purposes.

The fourth object is to so construct the device that a large area will be available for filtering and that the filtering medium is fully supported and reinforced to avoid any possibility of the strainers being torn and solid substances passing through same.

These, and other objects, will become more apparent from the specification following as illustrated in the accompanying drawing in which:

Figure 1 is a longitudinal section through the device. Figure 2 is a transverse section taken along the line 2—2 in Figure 1.

Similar numbers of reference refer to similar parts throughout the views.

Referring in detail to the drawing, the device is intended to be inserted into any pipe line between the terminals 10 which form the connections for the unions 11. A gasket 12 is placed between the members 10 and 11.

Threaded into one union 11 is the end 13 of a funnel-shaped outlet 14 provided with a flange 15, preferably ground to a joint. The flange 15 also has a longitudinally projecting annular flange 16, and the union between the members 14 and 15 is preferably braced with ribs 17.

Across the diameter of the flange 16 is placed a rod 18. Against the edge of the flange 16 is placed a perforated metal strainer 19 which also bears against the rod 18 and is supported thereby. A circular piece of cloth, or other filtering medium 20, is placed over the outside of the member 19 and extends beyond the outside of the flange 15.

The inlet portion of the strainer consists of a somewhat funnel-shaped inlet member 21 having a shoulder 22 formed in the end thereof wherein can seat a second strainer 23. The member 21 has a projecting flange 24 which extends beyond the shoulder 22, and is also preferably ground to a seat with the face of the flange 15. The flange 24 is braced to the member 21 by means of the ribs 25 to which are attached the hinged clamps 26 which are operated by the thumb screws 27. The member 21 is joined to its respective part 10 by means of the coupling 28.

In operation when a pump is used to pass the milk through the strainer it is preferably placed in the position illustrated, namely with the milk flowing upwardly through the strainer; and when employed with a gravity feed it is sometimes preferable to reverse this condition, namely to have the milk pass downwardly through the strainer.

It can be seen that when in the position shown in Figure 1 that any solid particles touching the filtering medium will be less apt to remain in an obstructing position than where the milk passes downwardly through the strainer. Obviously, even when used with gravity it will be possible to maintain the upward flow of milk by the introduction of a return bend in the line.

I am aware that many forms of milk strainers have been constructed in the past, in most cases the same being of a large size and at a cost which rendered same prohibitive to the average dairyman, the appended claim is therefore directed to a novel form of strainer which is especially applicable to single lines of pipe.

I claim:

In a milk strainer, the combination of a circular fabric strainer; a perforated metal strainer on each side of said fabric strainer of a smaller diameter than said fabric strainer; a funnel-shaped inlet member having a flange formed on its outer edge having a recess formed in said flange to receive all of said strainers, the portion of said fabric strainer projecting beyond its metal strainer resting against said flange; a funnel-shaped outlet member having a flange corresponding with the flange on said inlet member; an annular ring projecting from the flange on said outlet member into the recess on said inlet member; and clamp means across said flanges whereby a liquid-tight joint is formed between said funnel-shaped members.

HARVEY E. DUKE.